United States Patent
Singnurkar

(10) Patent No.: US 9,176,512 B2
(45) Date of Patent: Nov. 3, 2015

(54) MULTI-CURRENT SOURCE AND METHOD FOR REGULATING CURRENT

(75) Inventor: Pramod Singnurkar, Graz (AT)

(73) Assignee: ams AG, Unterpremstaetten (AT)

( * ) Notice: Subject to any disclaimer, the term of this patent is extended or adjusted under 35 U.S.C. 154(b) by 807 days.

(21) Appl. No.: 13/393,953

(22) PCT Filed: Jul. 20, 2010

(86) PCT No.: PCT/EP2010/060499
§ 371 (c)(1),
(2), (4) Date: May 29, 2012

(87) PCT Pub. No.: WO2011/026686
PCT Pub. Date: Mar. 10, 2011

(65) Prior Publication Data
US 2012/0228934 A1    Sep. 13, 2012

(30) Foreign Application Priority Data

Sep. 2, 2009  (EP) ..................................... 09011288

(51) Int. Cl.
*G05F 1/575*    (2006.01)
*G05F 1/56*    (2006.01)
(Continued)

(52) U.S. Cl.
CPC .............. *G05F 1/561* (2013.01); *G05F 3/262* (2013.01); *H05B 33/0812* (2013.01); *Y02B 20/345* (2013.01); *Y10T 307/352* (2015.04)

(58) Field of Classification Search
CPC ............... H02M 2001/003; H02M 2001/006; H02M 2001/009; H02M 2001/0025; H02J 1/04; G05F 1/462; G05F 1/565; G05F 1/561; G05F 1/575; G05F 1/577
USPC ............. 315/200 R, 194, 201, 205, 294, 297; 363/73, 74, 78, 79, 80; 323/267
See application file for complete search history.

(56) References Cited

U.S. PATENT DOCUMENTS 6,600,362 B1    7/2003  Gavrila 8,492,988 B2 *   7/2013  Nuhfer et al. ................. 315/291
(Continued)

FOREIGN PATENT DOCUMENTS

DE    10 2005 028 403    12/2006
DE    10 2006 059 355     6/2008

OTHER PUBLICATIONS

"AS3691—4 Precision 400mA Current Sources for RGB and Single Color LEDs", Datasheet, austrimicrosystems Inc., Austria, Revision 2.3.
(Continued)

*Primary Examiner* — Adolf Berhane
*Assistant Examiner* — Jye-June Lee
(74) *Attorney, Agent, or Firm* — McDermott Will & Emery LLP

(57) ABSTRACT

A multi-current-source comprises a voltage converter (VC), a first current source (CS1) with a first terminal (A1) which is adapted to be coupled to an output (OUT) of a voltage converter (VC) and with a second terminal (B1) which is adapted to be coupled to an input (IN) of the voltage converter (VC), at least a second current source (CS2) with a first terminal (A2) which is adapted to be coupled to the output (OUT) of the voltage converter (VC) and with a second terminal (B2) which is adapted to be coupled to the input (IN) of the voltage converter (VC), wherein the first current source (CS1) being adapted to provide a first load current (Il1) at its first terminal (A1) the first load current (Il1) being regulated to a first constant value and to provide a first unidirectional error current (Ierr1) at its second terminal (B1), wherein the at least one second current source (CS2) being adapted to provide a second load current (Il2) at its first terminal (A2), the second load current (Il2) being regulated to a second constant value and to provide a second unidirectional error current (Ierr2) at its second terminal (B2), such that a sum of the first unidirectional error current (Ierr1) and the second unidirectional error current (Ierr2) adjusts the first and the second load current (Il1, Il2).

12 Claims, 9 Drawing Sheets

(51) Int. Cl.
*G05F 3/26* (2006.01)
*H05B 33/08* (2006.01)

(56) References Cited

U.S. PATENT DOCUMENTS

| | | |
|---|---|---|
| 2008/0048573 A1 | 2/2008 | Ferentz et al. |
| 2009/0212717 A1 | 8/2009 | Trattler |
| 2010/0013411 A1* | 1/2010 | Krespach et al. ............. 315/294 |

OTHER PUBLICATIONS

"AS3693C-9—Channel high precision LED driver for LCD Backlight", Product Specification, Confidential, austriamicrosystems Inc., Austria, Revision 1.4/Aug. 13, 2009.

"AS3694—12 channel high precision LED driver for backlight and 3 DCDC Step up controller", Product Brief, austriamicrosystems Inc., Austria, Revision 1.1/Nov. 25, 2007.

* cited by examiner

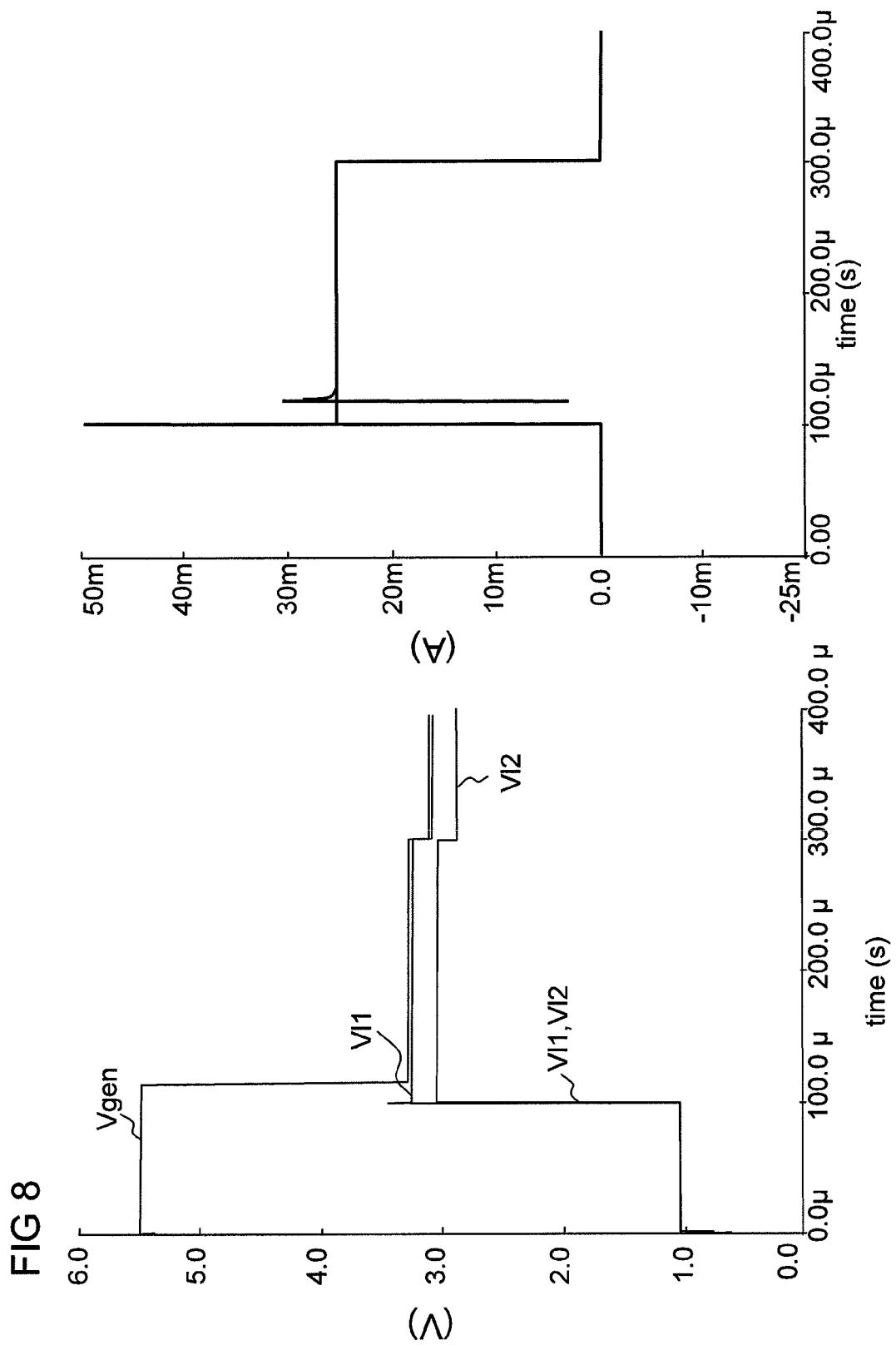

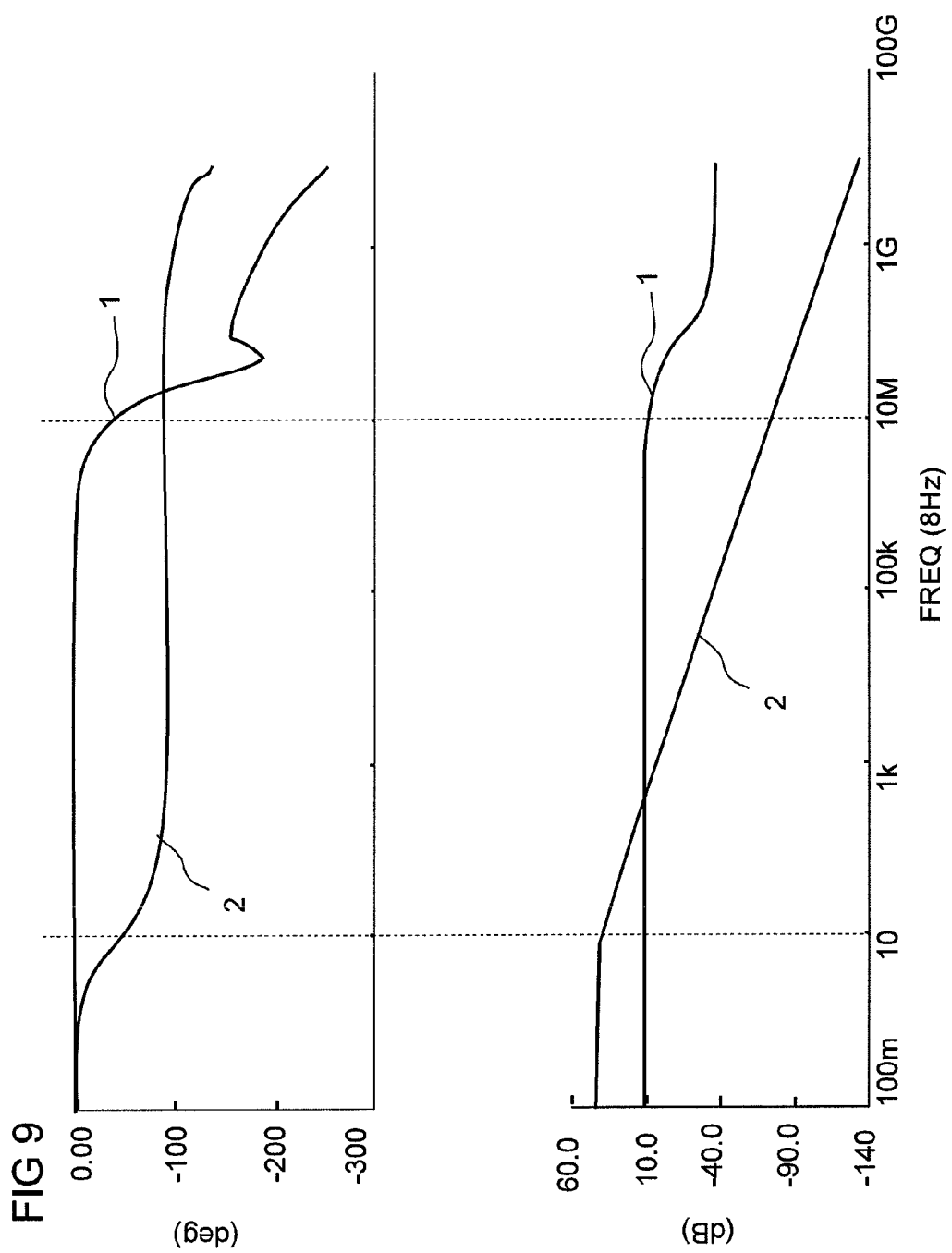

MULTI-CURRENT SOURCE AND METHOD FOR REGULATING CURRENT

RELATED APPLICATIONS

This is a U.S. national stage of application No. PCT/EP2010/060499, filed on Jul. 20, 2010.

This application claims the priority of European application no. 09011288.9 filed Sep. 2, 2009, the entire content of which is hereby incorporated by reference.

FIELD OF THE INVENTION

The present invention is related to a multi-current-source that comprises two or more, meaning multiple, individual current sources which are driven by only one voltage converter in a common way. Thereby, the individual current sources are controlled independently. A multi-current-source can be used to drive two or more electrical loads. An application of a multi-current-source, for instance, is in the lighting of at least two light-emitting diode, LED, strings which are used for general lighting, back lighting, or white color balancing. In this example, each LED string comprising two or more LEDs represents the electrical load.

BACKGROUND OF THE INVENTION

In a conventional multi-current-source, each individual current source comprises one operational amplifier to generate a load current and a second operational amplifier to generate an error voltage signal. The load current is provided to an electrical load which is coupled to the respective current source. With its other terminal, the load is coupled to a voltage converter used as supply. The error voltage signal depends on the difference between a target and an actual value of the load voltage and is fed back to the voltage converter. Thereby, the voltage supplied by the voltage converter to the load and to the multi-current-source is regulated. As the feedback circuit adds a dominant pole because of a required low-pass filter to the existing pole of the voltage converter, the regulation bandwidth of the overall circuit is limited. Due to the two poles, the response of the circuit is oscillatory. To improve this behaviour, the external components of the low-pass filter in the feedback loop to the voltage converter have to be increased. Consequently, the circuit cannot be integrated completely.

SUMMARY OF THE INVENTION

One object of the present invention is to provide a multi-current-source and a method for regulating current which enables a complete integrated solution.

In one exemplary embodiment, a multi-current-source comprises a voltage converter with an input and an output to provide a voltage, a first current source and at least a second current source. The first current source comprises a first terminal which is adapted to be coupled to the output of the voltage converter and a second terminal which is adapted to be coupled to the input of the voltage converter. The at least one second current source comprises a first terminal which is adapted to be coupled to the output of the voltage converter and a second terminal which is adapted to be coupled to the input of the voltage converter. Thereby, the first current source is adapted to provide a first load current at its first terminal, the first load current being regulated to a first constant value. Furthermore, the first current source is adapted to provide a first unidirectional error current at its second terminal. The at least one second current source is adapted to provide a second load current at its first terminal and a second unidirectional error current at its second terminal. The second load current is regulated to a second constant value. A sum of the first unidirectional error current and the second unidirectional error current adjusts the first and the second load current. Thereby, each error current is directly fed back to the input of the voltage converter.

The first and the second load current are individually regulated to a respective constant value with the help of the sum of the first and the second unidirectional error current.

As each load current provided by the multi-current-source is regulated to its respective constant value, no extra external components are required. This enables the complete integration of the multi-current-source.

A respective unidirectional error current designates a positive current, the value of which is zero or above zero.

The multi-current-source may well comprise three or more current sources which are connected in parallel to each other as described above.

In another embodiment example, the first and the at least one second current source each comprise current regulating and sensing means for sensing the respective load current at the respective first terminal, and for regulating the respective load current to the respective constant value, first voltage sensing means for sensing a respective load voltage at the respective first terminal, second voltage sensing means for sensing respective load voltage and a generating unit. The current regulating and means are connected between the respective first terminal and the respective second terminal. The current regulating and sensing means are adapted to provide a respective load current using a respective power device. The second voltage sensing means are connected between the respective first terminal and the respective second terminal. The second voltage sensing means are adapted to provide a functional voltage which is inverse proportional to the respective load voltage. The generating unit is connected to the second voltage sensing means. The generating unit is adapted to provide the respective error current at the respective second terminal as a function of the difference between the functional voltage and a target value of the functional voltage.

An actual value of each load current is measured by the respective current regulating and sensing means. An actual value of each load voltage is measured a first time by the first voltage sensing means. Each load current then is regulated to its respective target value using the actual values of the respective load current and the respective load voltage. The respective load current is provided using the respective power device. The actual value of each load voltage is measured a second time by the respective second voltage sensing means. A respective functional voltage is provided which is inverse proportional to the respective load voltage. Based on the difference between the respective actual value of the respective load voltage provided by the second voltage sensing means and the respective target value of the respective load voltage, each generating unit generates the respective unidirectional error current. All error currents are summed up and each load current is adjusted accordingly.

The voltage sensing by the second voltage sensing means is achieved by coupling the respective first terminal to a node where the respective functional voltage is provided via a respective delta voltage.

Due to the favorable combination of current and voltage sensing and the second voltage sensing only very low currents occur in the multi-current-source. Consequently, the silicon area needed is very small.

In a further exemplary embodiment, the current regulating and sensing means comprise a sensing resistor coupled to the respective first terminal via the power device.

In another exemplary embodiment, the current regulating and sensing means comprise a regulating amplifier with an inverting input coupled to the sensing resistor, with a non-inverting input to receive a reference voltage and with an output coupled to a control input of the power device. Thereby, the reference voltage is proportional to a target value of the respective load current.

The local current regulation of each current source is achieved with the regulator amplifier and the sensing resistor. The sensing resistor is connected in series with the power device to the first terminal. A current through the sensing resistor is proportional to the respective load current. The difference between the voltage across the sensing resistor and the reference voltage is used to adjust the load current.

In another exemplary embodiment the current regulating and sensing means comprise a sensing transistor with a control terminal which is coupled to the respective first terminal via the power device.

In another exemplary embodiment, the current regulating and sensing means comprise a first transistor connected to the sensing transistor and an auxiliary transistor. The first transistor is adapted to regulate a current in the sensing transistor using a first and a second reference current source.

In this local current sensing and regulation, the current in the sensing transistor is regulated to a value which is a function of the difference between the currents provided by the first and the second reference current sources.

As the respective first terminal is coupled to the sensing transistor and to the second voltage sensing means, a coupling of current regulation and voltage regulation is achieved. The second voltage sensing means thereby are coupled to the respective first terminal through the delta voltage.

In another exemplary embodiment, the generating unit comprises a transconductance amplifier and an output transistor. The transconductance amplifier comprises a non-inverting input to receive the respective target value of the respective functional voltage, and an inverting input coupled to an output of the second voltage sensing means to supply the functional voltage. The output transistor comprises a control terminal coupled to the output of the transconductance amplifier, a source terminal connected to a supply potential terminal and a drain terminal which is connected to the respective second terminal.

As long as the respective functional voltage is below its respective target value, the transconductance amplifier in combination with the output transistor generate a positive respective error current. Otherwise, the value of the respective error current is zero. Consequently, a unidirectional error current is provided. As the functional voltage is inverse proportional to the respective load voltage, the respective error current reflects the difference between the actual value of the respective load current and its respective target value.

As the transconductance amplifier preferably is implemented as a fast amplifier, high output accuracy of the multi-current-source at higher speed is achieved.

A target value of a current or a voltage is also designated as the steady state value of a current or a voltage.

In another exemplary embodiment, the generating unit comprises a current mirror and an auxiliary current source. The current mirror comprises an input which is connected to the output of the second voltage sensing means to receive a functional current which is proportional to the functional voltage. The current mirror further comprises an output which is connected to the respective second terminal. The auxiliary current source is adapted to supply a target value of the functional current which is proportional to the target value of the functional voltage. The target value of the functional current is supplied to the input of the current mirror.

The difference between the target value of the functional current and the actual value of the functional current is used to generate the respective error current.

In one embodiment a converter arrangement comprises a multi-current-source. The input of the voltage converter is connected to the second terminals of the first and the at least one second current source. An output of the voltage converter is adapted to be coupled to a respective first terminal of a first and at least a second load. The first terminal of the first current source is adapted to be coupled to a second terminal of the first load. The first terminal of the second current source is adapted to be coupled to the second terminal of the second load. The voltage provided by the voltage converter at its output is regulated such that the first and the at least one second load current provided by the first and the at least one second current source, respectively, are adjusted to their respective constant values using the first and at least the second unidirectional error currents.

The voltage provided by the voltage converter drives the first and the at least one second load, as well as the first and the at least one second current source. This voltage is a function of an actual value of the respective load current and the respective load voltage. Each load current is regulated to its individual target value. The voltage converter uses the combination of the error currents to adjust the voltage.

Because of the regulation of each respective load current and the direct feedback of each respective error current to the input of the voltage converter, no separate pole is introduced by the multi-current-source. Therefore, a control bandwidth of the voltage converter is not changed.

Furthermore, there is no limit regarding the voltage provided by the voltage converter. An extra error amplifier within the voltage converter is rendered redundant.

The value of each error current can be zero or any positive value.

In another embodiment the voltage converter comprises either a DC/DC converter, or a low-drop-out regulator or a charge pump.

In another exemplary embodiment of the converter arrangement the input of the voltage converter is coupled to a supply current source such that the sum of the first and at least the second unidirectional error currents is compared to a current supplied by the supply current source to generate an error voltage used to adjust the voltage provided by the voltage converter.

The sum of all unidirectional error currents is compared to the current supplied by the supply current source. The result in form of the error voltage is supplied to the voltage converter. The voltage at the output of the voltage converter is adjusted accordingly.

BRIEF DESCRIPTION OF THE DRAWINGS

FIG. 8 shows simulation result diagrams for the second embodiment of the invention, and FIG. 9 shows simulation result diagrams for the fourth embodiment of the invention.

DETAILED DESCRIPTION OF THE DRAWINGS

Figure 1:
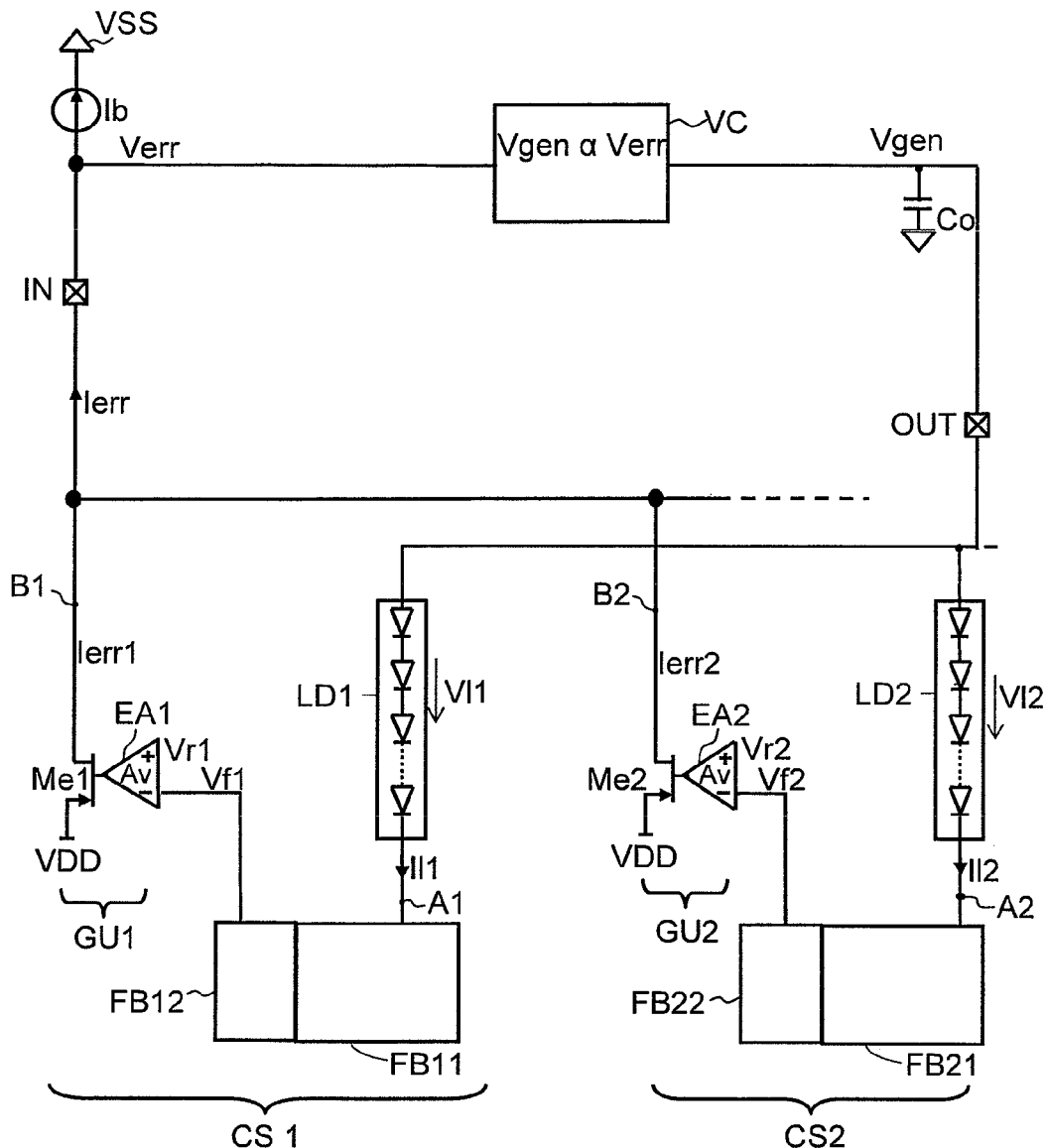
FIG. 1 shows a first embodiment example of a multi-current-source in a converter arrangement according to a first embodiment of the invention.

FIG. 1 shows a first embodiment example of a multi-current-source in a converter arrangement according to a first embodiment of the invention. The multi-current-source comprises a first current source CS1 and at least a second current source CS2. The converter arrangement comprises a voltage converter VC with an output OUT and an input IN coupled to the multi-current-source CS1, CS2. The first current source CS1 comprises a first terminal A1 and a second terminal B1. The first terminal A1 is coupled to the output OUT of the voltage converter VC via a first load LD1. The second terminal B1 of the first current source CS1 is coupled to the input IN of the voltage converter VC.

The second current source CS2 comprises a first terminal A2 and a second terminal B2. The first terminal A2 of the second current source CS2 is coupled to the output OUT of the voltage converter VC via a second load LD2. The second terminal B2 of the second current source CS2 is coupled to the input IN of the voltage converter VC. Consequently, the first and the second current sources CS1 and CS2 are connected in parallel to the voltage converter VC.

The first current source CS1 comprises a first functional block FB11, a second functional block FB12 and a first generating unit GU1. The first functional block FB11 is coupled to the first terminal A1 of the first current source CS1. The second functional block FB12 is coupled to the first functional block FB11 and to the first generating unit GU1. The first generating unit GU1 is coupled to the second terminal B1 of the first current source CS1.

The first generating unit GU1 comprises a transconductance amplifier EA1 and an output transistor Me1. Therein an inverting input of the transconductance amplifier EA1 is coupled to an output of the second functional block FB12. A non-inverting input of the transconductance amplifier EA1 is supplied with a target value Vr1 of a functional voltage Vf1. An output of the transconductance amplifier EA1 is coupled to a control input of the output transistor Me1. A source terminal of the output transistor Me1 is coupled to a supply potential terminal VDD. A drain terminal of the output transistor Me1 is coupled to the second terminal B1 of the first current source CS1 where a first error current Ierr1 is provided.

The first current source CS1 provides a first load current Il1 at its first terminal A1. The first current source CS1 provides the first error current Ierr1 at its second terminal B1.

The structure of the second current source CS2 is equivalent to the structure of the first current source CS1. The second current source CS2 comprises therefore a first functional block FB21, a second functional block FB22 and a second generating unit GU2. The functionality of the second current source CS2 is equivalent to the functionality of the first current source.

The first and second load LD1, LD2 each comprise for example two or more LEDs coupled in series. The first and second load LD1, LD2 each may as well comprise any other electrical load.

The input IN of the voltage converter VC is coupled to a reference potential terminal VSS via a supply current source Ib. The output OUT of the voltage converter is coupled to a smoothing capacitor Co.

At the output OUT of the voltage converter VC a voltage Vgen is provided to the first and the at least one second current source CS1, CS2 and to the first and at least the second load LD1, LD2. The first and the second current source CS1, CS2 provide the respective load current Il1, Il2 at their respective first terminals A1, A2. The voltage Vgen generated by the voltage converter VC applies a first load voltage Vl1 at the first load LD1 and a second load voltage Vl2 at the second load LD2.

In each first functional block FB11 and FB21 the respective load current Il1, Il2 is sensed. At the same time, in each first functional block FB11, FB21 a respective load voltage Vl1, Vl2 is sensed and the respective load current Il1, Il2 is regulated to a programmable constant value of the respective load current Il1, Il2. In each second functional block FB12 and FB22 of the first and second current sources CS1, CS2 the respective load voltage Vl1, Vl2 is sensed a second time. At the output of the second functional block FB12 of the first current source CS1 a first functional voltage Vf1 which is a function of the actual value of the first load voltage Vl1 is provided. At the output of the second functional block FB22 of the second current source CS2 a second functional voltage Vf2 is provided. The second functional voltage Vf2 is a function of the actual value of the second load voltage Vl2.

The first generating unit GU1 generates the first error current Ierr1 as a function of the difference between the first functional voltage Vf1 and the first target value Vr1 of the first load voltage Vl1. The second generating unit GU1 generates the second error current Ierr2 as a function of the difference between the second functional voltage Vf2 and the second target value Vr2 of the second load voltage Vl2. The respective error currents Ierr1 and Ierr2 are in a positive range as long as the respective first or second functional voltage Vf1, Vf2 is smaller than the respective first or second target value Vr1, Vr2 of the respective first or second load voltage Vl1, Vl2. At the input IN of the voltage converter VC the first and second error currents Ierr1, Ierr2 are summed up to a main error current Ierr. The main error current is compared with the current supplied by the supply current source Ib to generate an error voltage Verr. The voltage Vgen at the output OUT of the voltage converter VC is adjusted as a function of the error voltage Verr.

As can be seen, only one filter capacitor, the capacitor Co at the output OUT of the voltage generator VC is needed. Consequently, the multi-current-source CS1, CS2 can be integrated completely with the voltage converter VC.

Figure 2:
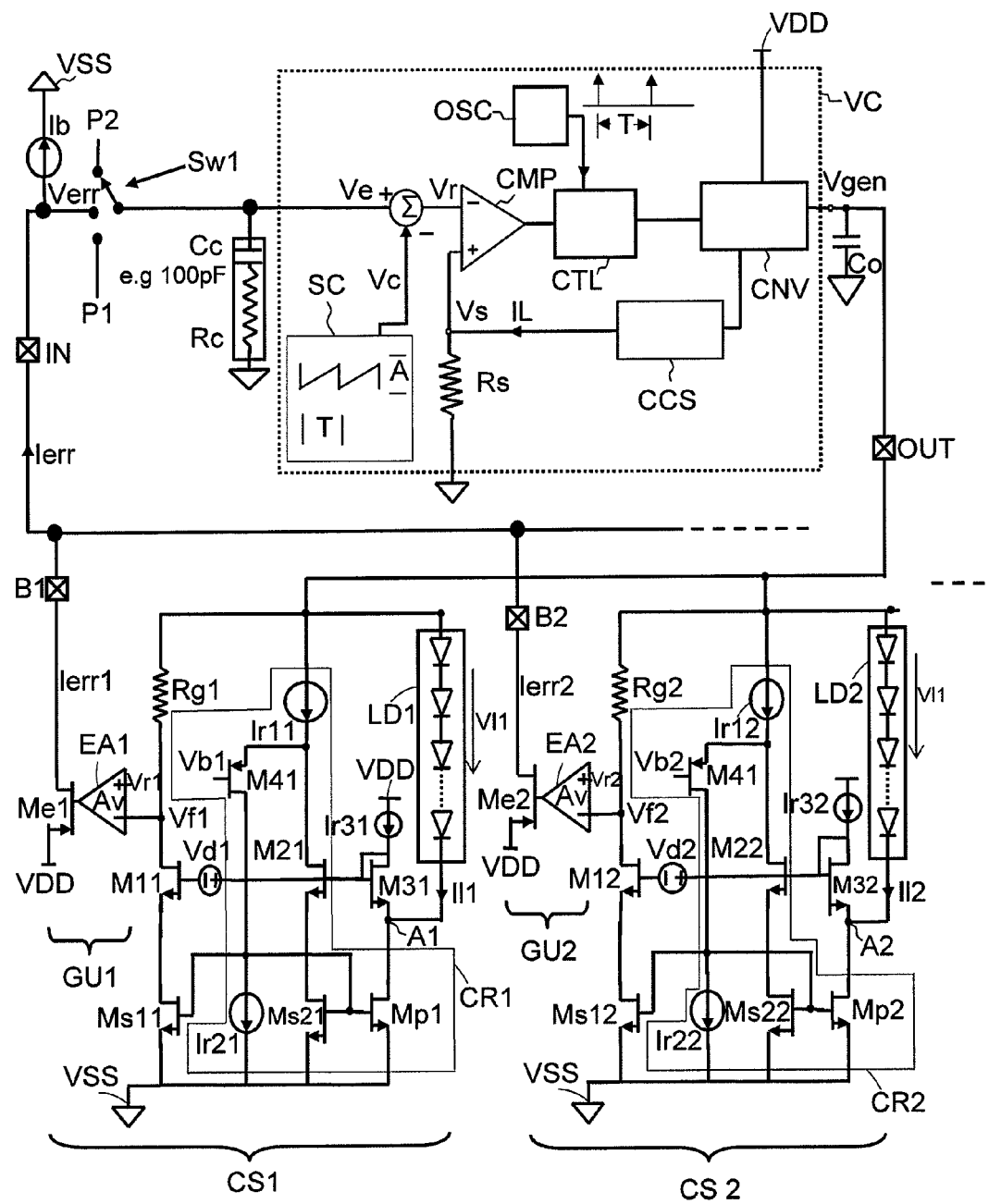
FIG. 2 shows a second embodiment example of a multi-current-source in a converter arrangement according to a second embodiment of the invention.

FIG. 2 shows a second embodiment example of a multi-current-source in a converter arrangement according to a second embodiment of the invention. Here a first implementation possibility of the first and second current sources CS1, CS2 is given. Each current source CS1 and CS2 comprises current sensing and regulation means, first and second voltage sensing means and first and second generating unit GU1, GU2. Thereby, current regulation and sensing means, as well as first voltage sensing means belong to the respective first functional block FB11, FB21 of FIG. 1. Second voltage sensing means belong to the second functional block FB21, FB22 of FIG. 1. The structure and functioning of the first current source CS1 is now explained in detail. This structure and mode of operation is also to be applied to the second current source CS2.

Current regulation and sensing means CR1 of the first current source CS1 comprise a sensing transistor Ms21, a power device Mp1, a first transistor M21, an auxiliary transistor M41, a first and a second reference current source Ir11 and Ir21. The power device Mp1 is preferably implemented as transistor. A drain terminal of the power device Mp1 is coupled to the first terminal A1 of the first current source CS1. A control terminal of the power device Mp1 is coupled to a control terminal of the sensing transistor Ms21. Source terminals of the power device Mp1 and the sensing transistor Ms21 are coupled to the reference potential terminal VSS. A drain terminal of the sensing transistor Ms21 is coupled to a source terminal of the first transistor M21. A drain terminal of the first transistor M21 is coupled to a source terminal of the auxiliary transistor M41 and to a first terminal of the first reference current source Ir11. The second terminal of the reference current source Ir11 is coupled to the output OUT of the voltage converter VC. A drain terminal of the auxiliary transistor M41 is coupled to the second reference current source Ir21 which is coupled to the reference potential terminal VSS. A control terminal of the auxiliary transistor M41 is supplied with a first bias voltage Vb1.

An actual value of the first load current Il1 is measured by the sensing transistor Ms21 using the first transistor M21 and the auxiliary transistor M41. The current in the sensing transistor Ms21 is regulated to a value which corresponds to the difference between the current supplied by the first reference current source Ir11 and the current supplied by the second reference current source Ir21.

The first voltage sensing means comprise the transistor M31 and a third reference current source Ir31. A source terminal of the transistor M31 is coupled to the drain terminal of the power device Mp1, as well as to the first terminal A1 of the first current source CS1. A control and a drain terminal of the transistor M31 are coupled to the control terminal of the first transistor M21, as well as to the third reference current source Ir31 which on the other hand is coupled to the supply potential terminal VDD. Thereby, the reference current provided by the third reference current source I31 is much smaller than the first load current Il1 and can therefore be neglected.

The second voltage sensing means comprise a resistor Rg1, transistors M11 and Ms11 and a voltage source supplying a delta voltage Vd1. The voltage source is coupled to the control terminal of transistor M11. A drain terminal of transistor M11 is coupled to the inverting input of the first transconductance amplifier EA1 and to the resistor Rg1. The resistor Rg1 is coupled to the output OUT with its second terminal. A source terminal of the transistor M11 is coupled to a drain terminal of transistor Ms11. A source terminal of transistor Ms11 is coupled to the reference potential terminal VSS. A control terminal of transistor Ms11 is coupled to the control terminals of the power device Mp1 and the sensing transistor Ms21.

A voltage at the first terminal A1 which is the first load voltage Vl1 is coupled to the drain terminals of transistor Ms11 and sensing transistor Ms21. Thereby, the current regulation is coupled to the voltage regulation. The coupling between the drain terminal of transistor Ms11 and the first terminal A1 is achieved via the first delta voltage Vd1.

The first load voltage Vl1 is sensed a first time by transistor M31. The sensed voltage is level shifted by the diode of transistor M31 and by the delta voltage Vd1. It is then shifted again by transistor M11. Transistor M11 is operated in the linear region. Therefore, transistor M11 works as resistance and a current in resistor Rg1 is transformed into the first functional voltage Vf1. The first functional voltage Vf1 corresponds to the drain voltage of transistor Ms11. As the source terminals of transistors Ms11 and Mp1 are connected and as the sizes of these transistors are matched, the current in transistor Ms11 is regulated to a constant value. Thereby the drain voltage of the power device Mp1 is also regulated to a constant value. This means that the load voltage Vl1 is changed into the first functional voltage Vf1 by transistor Ms11. Thereby, the first functional voltage Vf1 is inverse proportional to the load voltage Vl1.

In this embodiment, the input IN of the voltage converter is connected via a switch Sw1. The voltage converter VC is realized as DC/DC converter without error amplifier. The input IN of the voltage converter VC is connected to a compensation network comprising capacitance Cc and resistance Rc. The voltage converter VC comprises a slope compensation unit SC, a comparator unit CMP, digital control CTL, an oscillator OSC, a converter CNV, as well as a coil current sensing unit CCS.

The switch Sw1 is normally connected to the input IN, thereby passing the error voltage Verr to the voltage converter VC.

The voltage converter VC uses the main error current Ierr. The main error current Ierr in combination with the current delivered by the supply current source Ib and the compensation network Cc, Rc provides a voltage signal Verr. The voltage signal Verr is added with slope compensation in the slope compensation unit SC to generate the voltage signal Vr. The comparator unit CMP generates pulse-width modulated impulses by comparing the voltage signal Vr with a second voltage signal Vs. The output signal of the comparator unit CMP is fed to the digital control unit CTL and then to the converting unit CNV. The smoothing capacitor Co smoothes any alternate current ripple on the output OUT.

The switch Sw1 can also be put to position P1 and thereby be connected to a reference starting voltage. The voltage converter VC is consequently started at a predetermined value of the voltage Vgen. The switch can also be set into an open condition by connecting it to a second position P2. The voltage Vgen at the output of the voltage converter VC then starts at its last value. If the switch Sw1 is connected to the input IN, the voltage converter VC starts with the maximum value of the voltage Vgen.

Instead of a DC/DC converter as described here, any voltage converter can be used. Other examples of voltage converters are a charge pump or a low drop-out regulator.

Each generating unit GU1 and GU2 generates a positive error current Ierr1, Ierr2 if the respective functional voltage Vf1, Vf2 is smaller than the respective target value Vr1, Vr2 of the respective functional voltage Vf1, Vf2. The voltage Vgen at the output OUT of the voltage converter VC is automatically adjusted to a value where at least one of the functional voltages Vf1 or Vf2 is regulated to a respective target value Vr1 or Vr2. This regulation implies that all the current sources regulations of load currents Il1, Il2 have been achieved to a programmed value.

Each current source regulates its respective steady state value of the respective load current Il1, Il2 if a sufficient minimum of a respective load voltage Vl1, Vl2 at the respective first terminal A1, A2 is present. As an example, just one current source, e.g. the first current source CS1 is not regulating as the first load voltage Vl1 at its first terminal A1 is low. In this case, the respective functional voltage Vf1 is higher compared to the functional voltages of the other current sources. Hence, the error current Ierr1 of the first current source CS1 is higher. Therefore, the error voltage Verr at the input of the voltage converter VC increases. As a consequence, the voltage Vgen at the output (OUT) of the voltage generator VC increases, thereby increasing the load voltage Vl1 of the first current source CS1. To summarize, under steady state conditions, the load voltage Vl1 of the first current source CS1 will be just at a sufficient value to keep the load current Il1 regulated. Consequently, the load voltages of the other current sources will also increase. The higher a load voltage of the other current sources get, the more the respective error current Ierrx reduces. Hence, the sum of the error currents is dominantly contributed by only one current source whereas the other current sources are contributing less.

Figure 3:
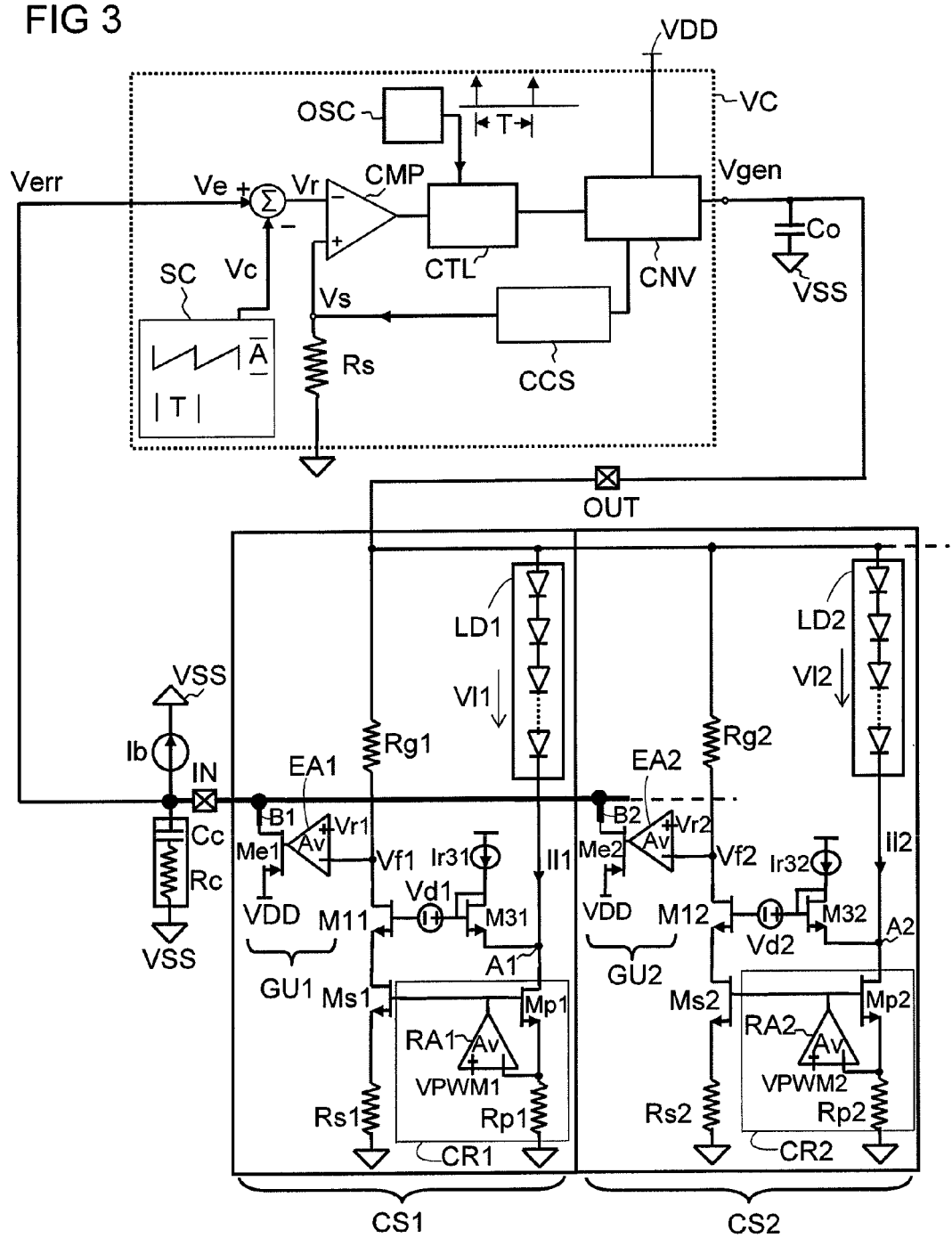
FIG. 3 shows a third embodiment example of a multi-current-source in a converter arrangement according to a third embodiment of the invention.

FIG. 3 shows a third embodiment example of a multi-current-source in a converter arrangement according to a third embodiment of the invention. The implementation of the first and second current source CS1, CS2 is equivalent to the implementation described under FIG. 2 except for the implementation of the first and the second current regulation means CR1, CR2. The first and second current regulation means CR1 and CR2 each comprise a regulation amplifier RA1, RA2 and a sensing resistor Rp1, Rp2. Each regulation amplifier RA1, RA2 comprises an inverting input which is coupled to the respective sensing resistor Rp1, Rp2 and a non-inverting input to receive a respective reference voltage VPWM1, VPWM2. An output of the respective regulator amplifier RA1, RA2 is coupled to the control input of the respective power device Mp1, Mp2.

With the help of the respective sensing resistor Rp1, Rp2 the respective load current Il1, Il2 is transformed into a corresponding voltage which is fed to the respective regulator amplifier RA1, RA2. The reference voltages VPWM1, VPWM2 are proportional to a respective target value of the respective load current Il1, Il2. As the current supplied by the third reference current sources Ir31, Ir32 is much smaller than the respective load currents Il1, Il2, the current through the sensing resistor Rp1, Rp2 is almost the same as the respective load current Il1, Il2.

The current in transistor Ms11 is regulated to a reference value which corresponds to a division of the target value Vr1 by the resistor Rg1. The drain voltage of the power device Mp1 differs from the drain voltage of transistor Ms11 by the first delta voltage Vd1. The first functional voltage Vf1 is regulated to its target value Vr1. An open drain error current Ierr1 is generated which is used to control a pulse-width modulation of the voltage converter VC.

The operational amplifiers EA1, EA2 preferably have a high gain.

In this embodiment, the switch Sw1 is redundant and the error voltage Verr is supplied directly to the DC/DC converter.

The delta voltages Vd1, Vd2 supplied by the voltage sources in the first and the second current source CS1, CS2 are low compared with corresponding delta voltages used in prior art implementations. Thereby, the efficiency of the multi-current-source increases. As no further external components besides the existing compensation network Cc, Rc of the voltage converter are necessary for operating the multi-current-source, the creation of a new dominant pole by the multi-current-source is prohibited. Consequently, the control bandwidth of the voltage converter VC is not changed. It can stay in the region of about 100 KHz. The output voltage Vgen can be any value. Finally, an error amplifier within the voltage converter is rendered redundant.

Figure 4:
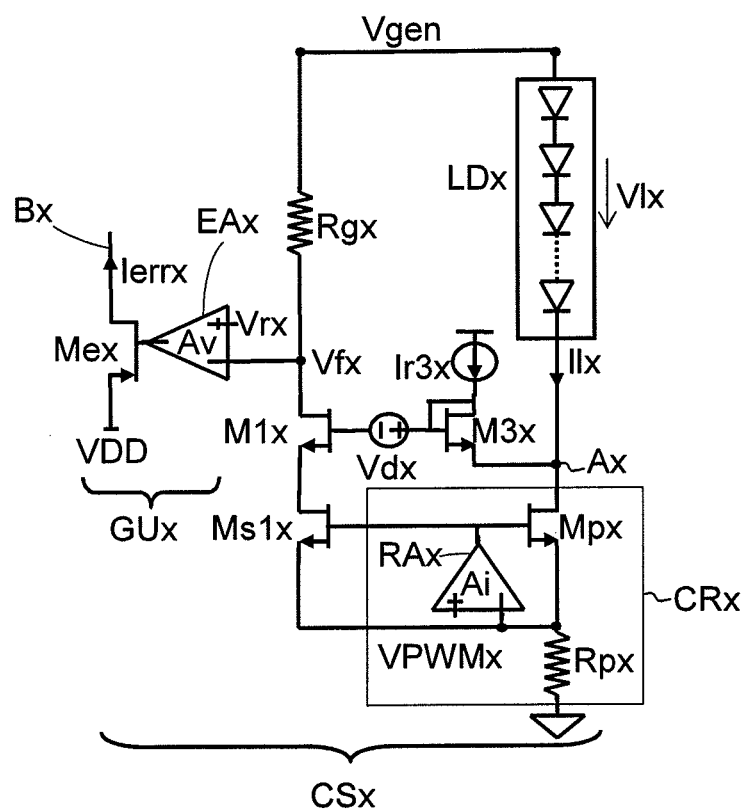
FIG. 4 shows an example of a single-current-source.

FIG. 4 shows an example of the single current source. The current source presented can be used in place of the first or the second current sources CS1, CS2 of FIGS. 1 to 3. The structure and functionality of this current source CSx is equivalent to the first or the second current source CS1, CS2 in FIG. 3 except that resistor Rsx which connects transistor Ms1x to the supply potential terminal VSS is omitted. Since the current in transistor Ms1x is very small, resistor Rsx is not required.

Figure 5:
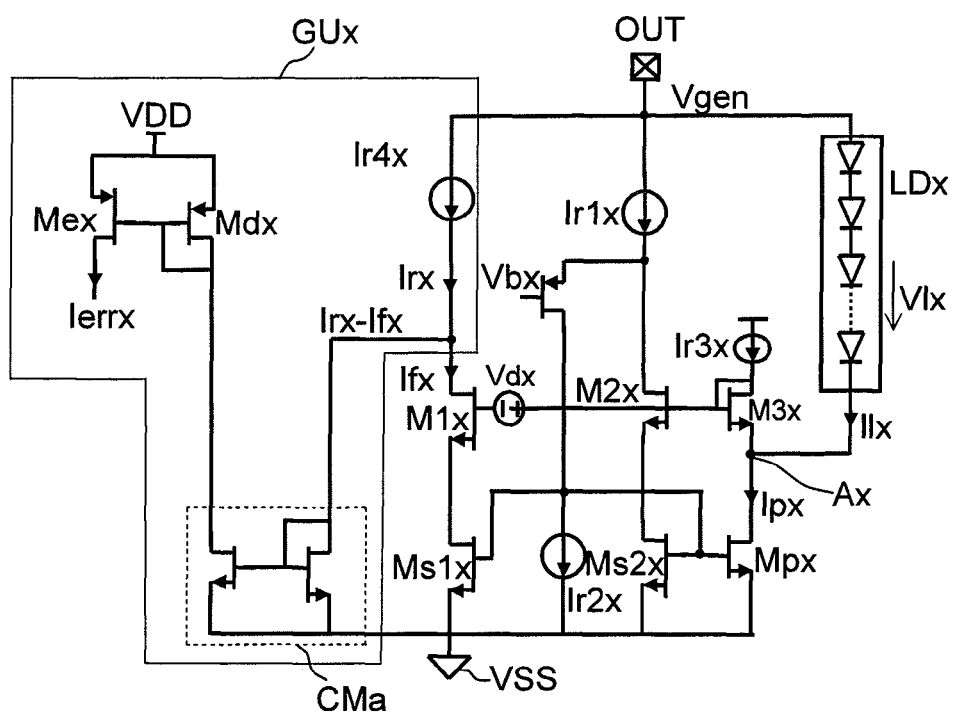
FIG. 5 shows another example of a single-current-source.

FIG. 5 shows another example of a single current source. This implementation of the current source CSx can also be used, for example, in the embodiments shown in FIGS. 2 and 3. This example of the current source CSx is equivalent to the first or the second current source CS1, CS2 in FIG. 2. Only the implementation of the generating unit GUx is different.

The generating unit GUx in this example comprises a main current mirror with transistors Mex and Mdx and an auxiliary current mirror CMa. It further comprises an auxiliary current source Ir4x. The auxiliary current source Ir4x is connected on the one hand to the output OUT of a voltage converter VC and on the other hand to an input of the auxiliary current mirror CMa. The output of the auxiliary current mirror CMa is coupled to an input of the main current mirror whose output is coupled to the respective second terminal Bx.

The auxiliary current source Ir4x supplies a target value Irx of a functional current Ifx. The functional current Ifx is provided by the output of the second current sensing means, namely at the drain terminal of transistor M1x. Therefore, the functional current Ifx is proportional to the functional voltage Vfx. A difference between the target value Irx and the functional current Ifx is mirrored by the auxiliary current mirror CMa and the main current mirror to the output of the main current mirror Mex, Mdx to become the error current Ierrx. The error current Ierrx is provided in relation to the supply potential terminal VDD.

A value of the target value Irx supplied by the auxiliary current source Ir4x is equal to the product of a current Ipx through the power device Mpx and the ratio of the sizes of the power device Mpx and transistor M1x. The size of a transistor is characterized by its width to length ratio.

When the load voltage Vlx increases, the error current Ierrx decreases.

Figure 6:
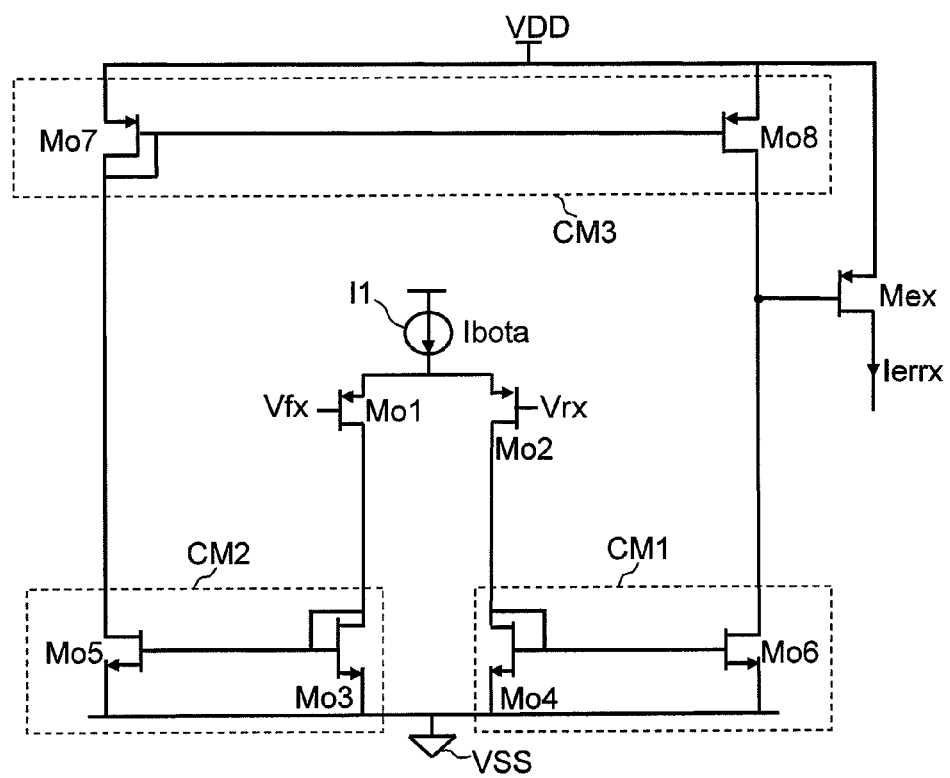
FIG. 6 shows an example of an operational transconductance amplifier.

FIG. 6 shows an example of a transconductance amplifier. This example can be used to implement the transconductance amplifiers EA1 and EA2 of FIG. 2, for example. The transconductance amplifier comprises eight transistors Mo1, Mo2, Mo3, Mo4, Mo5, Mo6, Mo7 and Mo8. Transistors Mo4 and Mo6 are forming a first current mirror CM1. Transistors Mo3 and Mo5 are forming a second current mirror CM2. Transistors Mo7 and Mob are forming a third current mirror CM3 which is coupled to the supply potential terminal VDD. A control input of transistor Mo1 realizes the inverting input of a transconductance amplifier EAx where the functional voltage Vfx is supplied. A control input of transistor Mot realizes the non-inverting input of the transconductance amplifier EAx where the target value Vrx of the respective functional voltage Vfx is supplied. The transconductance amplifier further comprises a supply current source I1 supplying a maximum current Ibota. The error current Ierrx is provided at the drain terminal of the output transistor Mex. If the respective functional voltage Vfx decreases, the error current Ierrx decreases, as well.

Figure 7:
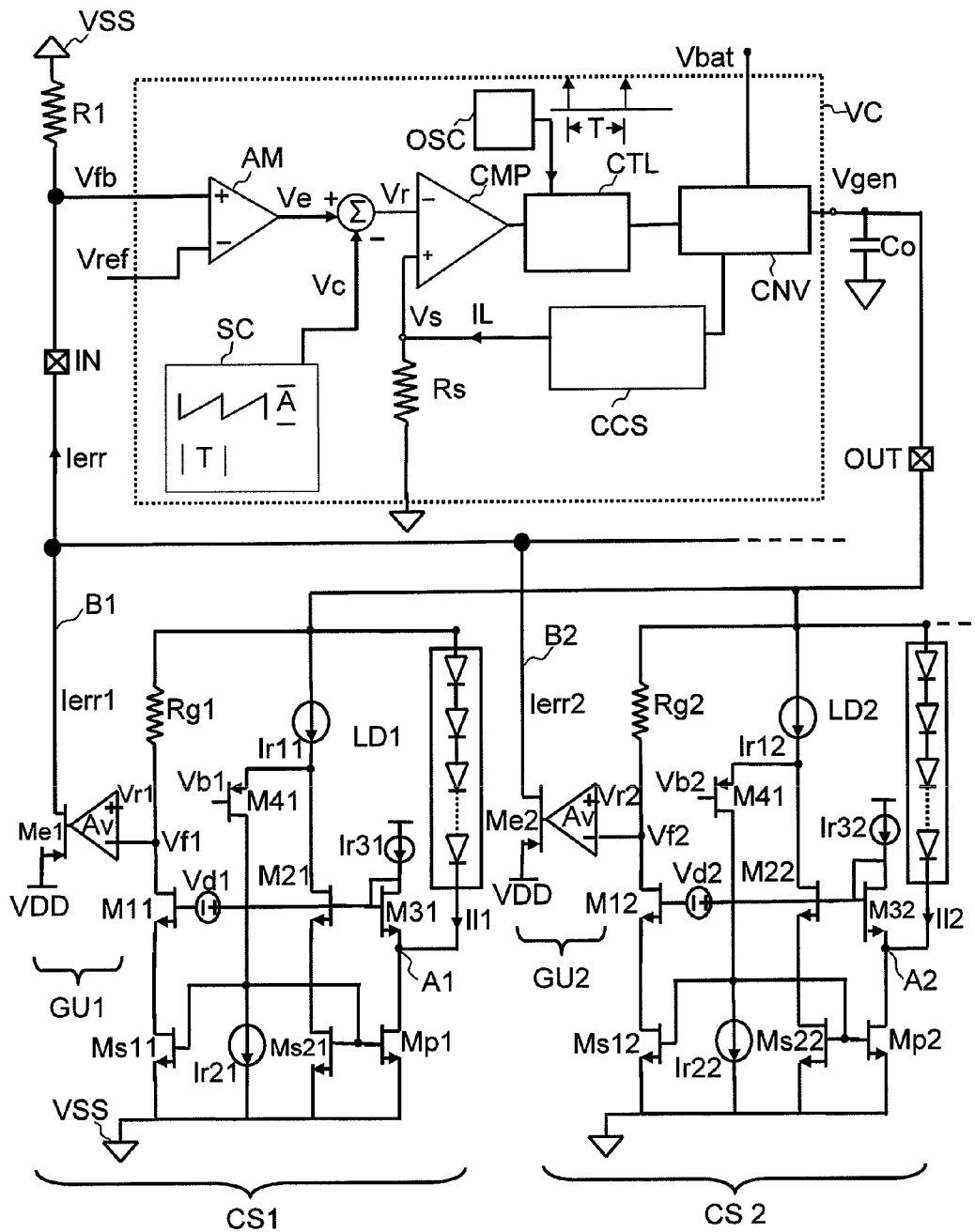
FIG. 7 shows a fourth embodiment example of a multi-current-source in a converter arrangement according to a fourth embodiment of the invention.

FIG. 7 shows a fourth embodiment example of a multi-current-source in a converter arrangement according to a fourth embodiment of the invention. This example is equivalent to the example described in FIG. 2, except that the voltage converter VC comprises an error amplifier AM which is taken advantage of by eliminating the compensation network Rc, Cc of FIG. 2. The input IN of the voltage converter is coupled to the reference potential terminal VSS using resistor R1.

FIG. 8 shows simulation result diagrams for the second embodiment of the invention. The left-hand diagram shows voltages in relation to time. The right-hand diagram shows currents in relation to time. In the left-hand diagram, the line marked "Vgen" shows the voltage Vgen at the output OUT of the voltage converter VC, the lines marked "Vl1", "Vl2" show the load voltages Vl1, Vl2, respectively. The upper line represents the first load voltage Vl1.

It can be seen that the voltage Vgen follows the higher of the two load voltages Vl1, Vl2, in this case the first load voltage Vl1, as soon as steady-state conditions are reached. As the value of the voltage Vgen is just a little bit above the first load voltage Vl1, power dissipation is greatly reduced.

The right-hand diagram shows the load currents Il1 and Il2 which are in this case regulated to the same value of 25.5 mA. As can be seen, every single current source is always regulated to the programmed value.

In summary, the response time that the multi-current-source needs to adapt to a new value of the load voltage is very small. The load currents are always maintained constant.

FIG. 9 shows simulation result diagrams for the fourth embodiment of the invention which is depicted in FIG. 7. The upper diagram shows a Bode-plot for the feedback part of the converter arrangement where the phase difference is depicted in relation to the frequency. The lower diagram shows another Bode-plot for the feedback part presenting the magnitude in decibel in relation to the frequency in hertz.

In the upper diagram, the line marked 1 one shows the results achieved with the embodiment of FIG. 7, the line marked with 2 shows the results achieved with prior art implementations. It can be seen that there is no change in phase for a wide frequency range with the embodiment of FIG. 7, whereas with a state of the art implementation a phase change occurs at very low frequencies. This is due to the fact that using the implementation of FIG. 7 the dominant pole of the connected voltage converter VC is not changed. The bandwidth achieved therefore is much higher.

A similar result is shown in the lower diagram with respect to the magnitude. The line marked with 1 again represents the simulation results of the embodiment of FIG. 7, whereas the line marked with 2 shows the simulation results for the state of the art.

From the presented voltage transfer functions it can be concluded that the stability of the whole circuit is greatly improved.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A multi-current-source comprising:
   a voltage converter having an input and an output to provide a voltage;
   a first current source with a first terminal which is adapted to be coupled to the output of the voltage converter and with a second terminal which is adapted to be coupled to the input of the voltage converter; and
   at least a second current source with a first terminal which is adapted to be coupled to the output of the voltage converter and with a second terminal which is adapted to be coupled to the input of the voltage converter;
   wherein the first current source is adapted to provide a first load current at its first terminal, the first load current being regulated to a first constant value and to provide a first unidirectional error current at its second terminal, wherein the at least one second current source is adapted to provide a second load current at its first terminal, the second load current is regulated to a second constant value and to provide a second unidirectional error current at its second terminal, such that a sum of the first unidirectional error current and the second unidirectional error current adjusts the first and the second load current,
   wherein each error current is directly fed back to the input of the voltage converter.

2. The multi-current-source according to claim 1, wherein the first and the at least one second current source each comprise:
   first voltage sensing means for sensing a respective load voltage at the respective first terminal;
   current regulating and sensing means for sensing the respective load current at the respective first terminal, and for regulating the respective load current to the respective constant value using actual values of the respective load current and the respective load voltage, current regulating and sensing means being connected between the respective first terminal and the respective second terminal and current regulating and sensing means being adapted to provide respective load current using respective power device;
   second voltage sensing means for sensing respective load voltage, the second voltage sensing means being connected between the respective first terminal and the respective second terminal and being adapted to provide a respective functional voltage which is inverse proportional to the respective load voltage; and
   a generating unit connected to the second voltage sensing means and being adapted to provide the respective error current at the respective second terminal as a function of the difference between the functional voltage and a target value of the functional voltage.

3. The multi-current-source according to claim 2, wherein the current regulating and sensing means comprise a sensing resistor coupled to a respective first terminal via the power device.

4. The multi-current-source according to claim 2, wherein the current regulating and sensing means comprise a sensing transistor with a control terminal which is coupled to the respective first terminal via the power device.

5. The multi-current-source according to claim 3, wherein the current regulating and sensing means comprise a regulator amplifier (RAx) with an inverting input coupled to the sensing resistor, with a non-inverting input to receive a reference voltage proportional to a target value of the respective load current and with an output coupled to a control input of the power device.

6. The multi-current-source according to claim 4, wherein the current regulating and sensing means comprise a first transistor (M2x) connected to the sensing transistor, the first transistor being adapted to regulate a current in the sensing transistor using a first and a second reference current source and an auxiliary transistor.

7. The multi-current-source according to claim 2, wherein the generating unit comprises:
   a transconductance amplifier with a non-inverting input to receive the respective target value of the respective functional voltage, an inverting input coupled to an output of the second voltage sensing means to supply the functional voltage; and
   an output transistor with a control terminal coupled to the output of the transconductance amplifier, a source terminal connected to a supply potential terminal and a drain terminal which is connected to the respective second terminal.

8. The multi-current-source according to claim 2, wherein the generating unit comprises a current mirror with an input connected to the output of the second voltage sensing means to receive a functional current which is proportional to the functional voltage and an output connected to the respective second terminal, and an auxiliary current source to supply a target value (Irx) of the functional current which is proportional to the target value of the functional voltage wherein the target value (Irx) of the functional current is supplied to the input of the current mirror.

9. A converter arrangement comprising:
   a multi-current source according to claim 1,
   wherein the voltage converter has its input connected to the second terminals of the first and of the at least one second current source and has its output adapted to be coupled to a respective first terminal of a first and at least a second load,
   wherein the first terminal of the first current source is adapted to be coupled to a second terminal of the first load and the first terminal of the second current source is adapted to be coupled to the second terminal of the second load, and
   wherein the voltage provided by the voltage converter at its output is regulated such that the first and the at least one second load current provided by the first and the at least one second current source respectively are adjusted to their respective constant value using the first and at least the second unidirectional error currents.

10. The converter arrangement according to claim 9,
    wherein the voltage converter comprises a DC/DC converter, a low-drop-out regulator or a charge pump.

11. The converter arrangement according to claim 9, wherein the input of the voltage converter is coupled to a supply current source (Ib) such that the sum of the first and at least the second unidirectional error currents is compared to a current supplied by the supply current source to generate an error voltage (Verr) used to adjust the voltage provided by the voltage converter.

12. A method for regulating current comprising the steps of:
    supplying by a voltage converter a voltage which is a function of a load current and a load voltage to a multi-current-source providing at least two load currents and at least two unidirectional error currents;
    sensing an actual value of each load current;
    sensing an actual value of each load voltage a first time;
    regulating each load current to a respective target value of the respective load current using the actual values of the respective load current and the respective load voltage;
    sensing an actual value of each load voltage a second time;
    generating a respective error current as a function of the difference between the respective actual value of the respective load voltage and a respective target value of the respective load voltage; and
    summing up all error currents, feeding them back directly to an input of the voltage converter and adjusting the supplied voltage accordingly.

\* \* \* \* \*